United States Patent [19]

Yagi et al.

[11] 3,843,742

[45] Oct. 22, 1974

[54] PROCESS FOR PREPARING ISOPRENE TRIMER

[75] Inventors: Misao Yagi, Kanagawa; Toshiaki Sakaguchi, Tokyo; Susumu Akutagama, Tokyo; Akira Komatsu, Tokyo, all of Japan

[73] Assignee: Takasago Perfumery Co., Ltd., Tokyo, Japan

[22] Filed: Oct. 5, 1973

[21] Appl. No.: 404,050

[52] U.S. Cl.............................. 260/677 R, 260/666 B
[51] Int. Cl............................................. C07c 11/16
[58] Field of Search........... 260/677, 683.15, 666 B

[56] References Cited
UNITED STATES PATENTS

| | | | |
|---|---|---|---|
| 3,219,716 | 11/1965 | Wittenberg et al. | 260/666 |
| 3,457,319 | 7/1969 | Olechowski | 260/677 |
| 3,522,321 | 7/1970 | DeYoang | 260/666 |
| 3,567,792 | 3/1971 | Bozik et al. | 260/677 |
| 3,689,585 | 9/1972 | Morikawa | 260/677 |
| 3,691,250 | 9/1972 | Coulson et al. | 260/677 |

Primary Examiner—Delbert E. Gantz
Assistant Examiner—Juanita M. Nelson
Attorney, Agent, or Firm—Sughrue, Rothwell, Mion, Zinn and Macpeak

[57] ABSTRACT

Isoprene is trimerized as a chain by using a catalyst system obtained by reducing a nickel compound with an organic aluminum compound in the presence of a ligand selected from the group consisting of an acetylene compound, an organic arsenic compound, an organic antimony compound, a phosphorus compound, an isonitrile compound and an isocyanate compound, to prepare isoprene trimer of the formula (I):

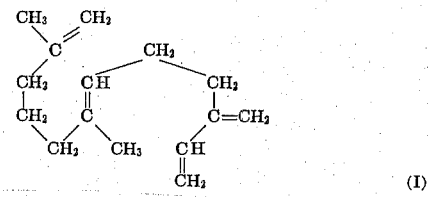

(I)

9 Claims, No Drawings

PROCESS FOR PREPARING ISOPRENE TRIMER

BACKGROUND OF THE INVENTION

1. Field of the Invention

This invention relates to a process for preparing isoprene trimer, and, more precisely, to a process for preparing an isoprene trimer of the following formula (I)

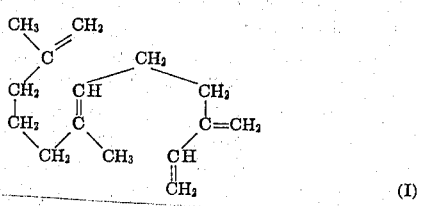

by oligomerization of isoprene.

2. Description of the Prior Art

Various studies have heretofore been carried out widely concerning the oligomerization of conjugated diene compounds, especially butadiene. In particular, many technical reports have disclosed the preparation of a chain dimer, cyclic dimer, cyclic trimer, etc. of butadiene using a catalyst system obtained by reducing a nickel compound with an organic metal compound in the presence of various kinds of ligands.

SUMMARY OF THE INVENTION

The inventors of this invention have studied the synthesis of terpene compounds, sesquiterpene compounds and diterpene compounds by oligomerization of isoprene using conjugated diene compounds as the starting material, and during this study have discovered a catalyst system which is effective for selectively forming a chain trimer of isoprene of the following formula (I) having a terpene skeleton; while reducing the formation of other dimers:

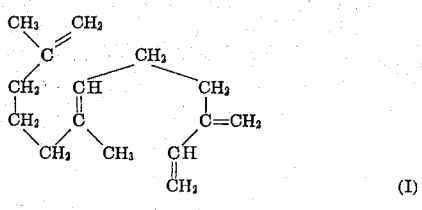

This invention, therefore, provides a process for preparing the isoprene trimer of the above formula (I) by trimerizing isoprene as a chain by using a catalyst system obtained by reducing a nickel compound with an organic aluminum compound in the presence of a specific ligand.

DETAILED DESCRIPTION OF THE INVENTION

The isoprene trimer of the formula (I) has a terpene skeleton consisting of a 1 to 4 combination of isoprenes, and this is quite similar to the farnesene present say in natural ylang-ylang oil, hop, etc., in that the position of the conjugated double bond of the present isoprene trimer is the same as that in natural farnesene although the position of other double bonds is somewhat different. This isoprene trimer and farnesene contain a myrcene type conjugated diene in their molecules, and the reactivity of these two is quite the same. Accordingly, the isoprene trimer (I) obtained in the present invention is extremely important as a farnesene analogue, from which squalene (or squalane) can be derived by the dimerization thereof, and these derivatives are useful as cosmetic materials. In addition, the isoprene trimer (I) is extremely valuable as a starting material for producing farnesol and farnesol acetate which are useful as cosmetic materials, and as an intermediate for synthesizing isophytol which is useful as a raw material for the synthesis of vitamin E.

As described above, the isoprene trimer obtained in the present invention can be utilized for the preparation of squalene (or squalane) in accordance with the processes as disclosed in the applicants' co-pending U.S. application Ser. Nos. 362,986 (filed on May 23, 1973) and 363,700 (filed on May 24, 1973). That is, the isoprene trimer can be dimerized in the presence of a palladium or a nickel catalyst to obtain squalene, which is then hydrogenated at a temperature of 150°C under a hydrogen pressure of 50 Kg/cm² for a period of 3 hours in the presence of a Raney nickel catalyst thereby yielding squalane. (Natural squalene is obtainable from liver oil of sharks.) The squalene or squalane is a raw material useful in preparing various cosmetics and can also be used as a low temperature machine oil.

Further, the isoprene trimer can be hydrochlorinated with hydrogen chloride in the presence of copper chloride to give farnsyl chloride. The chloride group is then replaced by an acetyl group using sodium acetate to give farnesol acetate, which is then hydrolyzed to obtain farnesol. On the other hand, the farnesyl chloride obtained above can be reacted with acetoacetic acid to give an unsaturated ketonic compound, which is then reduced with hydrogen in the presence of a palladium catalyst to a saturated ketonic compound followed by reaction with vinyl magnesium chloride to obtain isophytol.

The nickel compounds which can be used for the preparation of the catalysts employed in the process of the present invention include the nickel salts represented by the formula $NiX_2$, for example, the nickel halides ($NiCl_2$, $NiBr_2$ or $NiI_2$ e.g., where X is a halogen atom such as a chlorine atom, a bromine atom or an iodine atom) and the organic acid salts of nickel such as nickel naphthenate, nickel caproate, nickel 2-ethyl hexanoate, e.g., where X is an organic acid radical, etc.; nickel-chelate compounds, for example, represented by nickel-acetylacetonate, nickel-salicylaldehyde-ethylenediimine, etc.; and non-valent nickel complexes, for example, represented by bis-cyclooctadiene-nickel or bis-$\pi$-allyl-nickel.

Representative of the ligands which can be employed, are, for example, acetylene compounds represented by the formula $R^1C \equiv CR^2$ (where $R^1$ and $R^2$ each represents a hydrogen atom or a hydrocarbon group, e.g., a methyl, an ethyl and a phenyl group such as acetylene, butyne-1, butyne-2 and phenylacetylene); organic antimony or organic arsenic compounds represented by the formula $R_3^3Sb$ or $R_3^3As$ (where $R^3$ represents an alkyl group having two to five carbon atoms or a phenyl group, for example, tri-ethyl arsenic, tri-phenyl-antimony, tri-n-butyl arsenic, tri-n-butyl-antimony, etc.); phosphorus compounds represented by the formula $R_3^4P$ (where $R^4$ represents an alkyl group having two to eight carbon atoms, a phenyl group or a cyclohexyl group, for example, tri-n-butyl-phosphine, tri-phenyl-phosphine, tri-cyclohexyl-phosphine, etc.); and isonitrile compounds or isocyanate compounds represented by the formula $R^5NC$ or $R^5NCO$ ($R^5$ represents an alkyl group having four to eight carbon atoms, a phenyl group or a cyclohexyl group, for example, butyl isonitrile, hexyl isonitrile, octyl isonitrile, phenyl isonitrile, cyclohexyl isonitrile butylisocyanate, hexylisocyanate, octylisocyanate, phenylisocyanate, cyclohexylisocyanate).

Representative organic aluminum compounds used as a reducing agent in the process of the present invention are, for example, the trialkyl aluminum compounds represented by the formula $R_3^6Al$ (where $R^6$ represents an alkyl group having 1 to 6 carbon atoms, e.g., a methyl, an ethyl or an isobutyl group, e.g., tri-methyl aluminium, tri-ethyl aluminium, etc.,) and the anisole coordination compound thereof represented by the formula $R_3^6Al$. (anisole) as well as $(C_2H_5)_2Al$-$(OC_2H_5)$, $[(CH_3)_2CHCH_2]_2AlH$, $(C_2H_5)_2AlCl$, etc.

In the process of the present invention, it is preferable to use from 1 to 5 moles, especially 1 to 2 moles, of the above described ligand per one mole of the nickel compound, and to use from 4 to 20 moles, especially 4 to 8 moles, of the reducing agent per one mole of the nickel compound.

The reaction of the present invention can be carried out in the absence of any solvent, but can also be carried out in a hydrocarbon solvent such as an aromatic hydrocarbon solvent, e.g., benzene, toluene, xylene, etc., an aliphatic hydrocarbon solvent, e.g., alkanes such as pentane, hexane, an alicyclic hydrocarbon solvent, e.g., cycloalkanes such as cyclohexane, etc.

The preparation of the above described catalysts used in the process of the present invention can be effected by admixing and reacting the nickel compound, the ligand and the organic aluminum compound, and it is preferable to add a small amount of isoprene, which is a starting material of the present invention during the reaction of these materials, in order to attain favorable result.

The preparation of the catalyst can be carried out in a separate reactor which is different from that for used for oligomerization, but the preparation and oligomerization can also be carried out in the same reactor if desired. In the latter case, the nickel compound, the ligand, the organic aluminum compound and starting material isoprene can be simultaneously admixed and reacted, but it is preferable to react, initially, the nickel compound, the ligand and the organic aluminum compound by adding thereto a small amount of isoprene to first prepare the catalyst and thereafter isoprene is added to the resulting reaction product. The molar ratio of the catalyst to the isoprene in the timerization is 1 : 500 to 1,000. It is not essential that a solvent be used in the reaction, but it is advantageous to conduct the trimerization in the presence of a solvent when the catalyst is prepared in situ to facilitate stirring and cooling operations. The solvent (any one of those solvents set forth above) is employed in an amount of one-tenth to one-twentieth by volume based on the isoprene.

The timerization reaction is preferable carried out in an inert atmosphere such as nitrogen or argon, with nitrogen being preferred from the standpoint of economics, for about 5 to 15 hours, especially about 10 to 12 hours, at a temperature of about 40° to 120°C, especially about 70° to 80°C, for attaining favorable results. The trimerization reaction is conducted under an isoprene pressure at the reaction temperature, of generally from about 2.0 to about 11.0 kg/cm². When the catalyst is separately prepared, the same reaction conditions as those used for the reaction in which the catalyst is prepared in situ are employed.

The invention will be illustrated in greater detail by reference to the following examples. Unless otherwise indicated, all percents and parts are by weight.

EXAMPLE 1

A pressure reactor of a capacity of 100 ml was filled with nitrogen and 2 mmoles of nickel naphthenate, 20 ml of isoprene and 2 mmoles of phenylacetylene were added thereto and dissolved. Then 12 mmoles of tri-ethyl aluminum (40 v/v percent toluene solution) were added dropwise thereto at −10°C for reduction, and further, the entire mixture was reacted for 10 minutes at room temperature (about 20° to 30°C). Next, 50 ml of isoprene (the isoprene used was thus 70 ml, 0.7 mole) was added to the resulting reaction mixture and then the container was tightly sealed to carry out the reaction for 12 hours at 80°C. After the reaction was completed, the catalyst was decomposed with 10 ml of diluted hydrochloric acid (6NHCl) and extracted with ethyl ether, and the ether layer was washed with 3 percent by weight aqueous sodium bicarbonate solution and then 3 times with 30 ml of water and thereafter was concentrated. Then, the resulting concentrated product was distilled. After distillation, 33g of isoprene trimer fraction (boiling point: 75°–100°C/0.3 mmHg) were obtained, and it was confirmed through gas chromatography that the fraction obtained included 70 percent of the chain trimer of the formula (I). The structure of the formula (I) was confirmed using infrared absorption spectral analysis, nuclear magnetic resonance and mass spectral analysis. Yield of trimer: 70.2 percent.

EXAMPLE 2

2 mmoles of nickel naphthenate, 0.7 mole of isoprene, 2 mmoles of tri-n-butyl arsenic and 12 mmoles of triethyl aluminum were used and these materials were processed according to the same procedures as described in Example 1 to obtain 35.3g of isoprene trimer fraction. The obtained isoprene trimer contained 75 percent of the chain trimer of the formula (I). Yield of trimer: 75 percent

EXAMPLE 3

2 mmoles of nickel naphtenate, 0.7 mole of isoprene, 2 mmoles of tri-n-butyl antimony and 12 mmoles of triethyl aluminum were used and these materials were processed according to the same procedures as described in Example 1 to obtain 33g of an isoprene trimer fraction.

The isoprene trimer obtained contained 75 percent of the chain trimer of the formula (I). Yield of trimer: 70.2 percent

EXAMPLE 4

2 mmoles of nickel acetylacetonate, 0.7 mole of isoprene, 2 mmoles of tri-t-butylisonitrile and 12 mmoles of triethyl aluminum were used and these materials were processed according to the same procedures as described in Example 1 to obtain 28.2g of an isoprene trimer fraction.

The trimer obtained contained 65 percent of the chain trimer of the formula (I). Yield of trimer: 60 percent

EXAMPLE 5

2 mmoles of nickel acetylacetonate, 0.7 mole of isoprene, 2 mmoles of phenylisocyanate and 12 mmoles of triethyl aluminum were used. These materials were processed according to the same procedures as described in Example 1 to obtain 26.9g of an isoprene trimer fraction.

The trimer obtained contained 63 percent of the chain trimer of the formula (I). Yield of trimer: 57 percent

EXAMPLE 6

2 mmoles of bis-π-allyl-nickel, 0.7 mole of isoprene, 2 mmoles of tricyclohexyl phosphine and 12 mmoles of triethyl aluminum were used and these materials were processed according to the procedures described in Example 1 to obtain 25g of an isoprene trimer fraction.

The trimer obtained contained 65 percent of the chain trimer of the formula (I). Yield of trimer: 53.2 percent

EXAMPLE 7

2 mmoles of nickel-salicylaldehyde-ethylenediimine, 2 mmoles of tri-phenyl phosphine, 0.7 mole of isoprene and 12 mmoles of triethyl aluminum-anisole adduct were used and these materials were processed according to the procedures described in Example 1 to obtain 32g of an isoprene trimer fraction.

The trimer obtained contained 65 percent of the chain trimer of the formula (I). Yield of trimer: 68 percent

EXAMPLE 8

A mixture of 2 mmoles of bis-triphenylphosphine-nickeldicarbonyl, 4 mmoles of phenylacetylene and 20 ml of toluene was heated at 30°–40°C for about 15 minutes, and then 0.7 mole of isoprene and 12 mmoles of triethyl aluminum were added thereto at −10°C to reduce the nickel compound. Further, the entire mixture was reacted for 10 minutes at room temperature, and then was processed according to the same procedures as described in Example 1, whereby 35.0g of an isoprene trimer fraction was obtained.

The trimer obtained contained 65 percent of the chain trimer of the formula (I). Yield of trimer: 74.5 percent While the invention has been described in detail and with reference to specific embodiments thereof, it will be apparent to one skilled in the art that various changes and modifications can be made therein without departing from the spirit and scope thereof.

What is claimed is:

1. A process for preparing an isoprene trimer having the general formula (I) comprising trimerizing isoprene using a catalyst system obtained by reducing a nickel compound wherein said nickel compound is selected from the group consisting of a nickel salt of an organic acid; a nickel halide; a nickel-chelate compound; and a non-valent nickel complex with an organic aluminum compound consisting of a trialkyl aluminium compound in the presence of a ligand selected from the group consisting of an acetylene compound, an organic arsenic compound, an organic antimony compound, a phosphorus compound, an isonitrile compound and an isocyanate compound,:

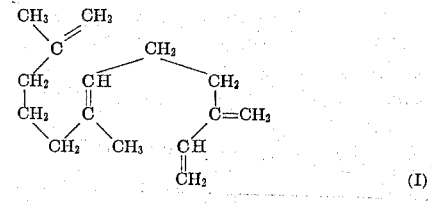

2. The process as claimed in claim 1, wherein said ligand is selected from the group consisting of acetylene compounds represented by the formula $R^1C \equiv CR^2$ where $R^1$ and $R^2$ each represents H or a hydrocarbon group; organic antimony or organic arsenic compounds represented by the formula $R_3^3Sb$ or $R_3^3As$, where $R^3$ represents a hydrocarbon group; phosphorus compounds represented by the formula $R_3^4P$, where $R^4$ represents a hydrocarbon group; and isonitrile compounds or isocyanate compounds represented by the formula $R^5NC$ or $R^5NCO$ where $R^5$ represents a hydrocarbon group.

3. The process as claimed in claim 1, wherein said organic aluminum compound is selected from the group consisting of trialkyl aluminum compounds represented by the formula $R_3^6Al$ where $R^6$ represents an alkyl group having one to six carbon atoms, the anisole coordination compounds thereof represented by the formula $R_3^6Al(anisole)$, wherein $R^6$ is as described above, $(C_2H_5)_2Al(OC_2H_5)$, $[(CH_3)_2CHCH_2]_2AlH$, and $(C_2H_5)_2AlCl$.

4. The process as claimed in claim 1, wherein from 1 to 5 moles of said ligand and from 4 to 20 moles of said organic aluminum compound are used each per mole of said nickel compound.

5. The process as claimed in claim 1, wherein said trimerization is carried out for from 5 to 15 hours at a temperature of 40° to 120°C.

6. The process as claimed in claim 1, wherein said nickel salt of an organic acid is nickel caproate, nickel naphthenate or nickel 2-ethylhexanoate, wherein said nickel halide is nickel chloride, nickel bromide or nickel iodide, wherein said nickel-chelate compound is nickel acetylactonate or nickel salicylaldehyde-ethylenediimine, and wherein said non-valent nickel complex is bis-cyclooctadiene-nickel or bis-π-allylnickel.

7. The process as claimed in claim 2, wherein said $R^1$ and $R^2$ each represents a hydrogen atom, a methyl group, an ethyl group or a phenyl group, wherein $R^3$ represents an alkyl group having two to five carbon atoms or a phenyl group, wherein $R^4$ represents an alkyl group having two to eight carbon atoms, a phenyl group or a cyclohexyl group and $R^5$ represents an alkyl group having four to eight carbon atoms, a phenyl group or a cyclohexyl group.

8. The process as claimed in claim 4, wherein the amount of said ligand is 1 to 2 mols, and the amount of said organic aluminum compound is 4 to 8 mols, per mol of said nickel compound.

9. The process as claimed in claim 5, wherein said trimerization is carried out an inert gas atmosphere for from 10 to 12 hours at a temperature of 70° to 80°C.

* * * * *